United States Patent Office 2,771,362
Patented Nov. 20, 1956

1

2,771,362

CELLULOSE FIBROUS PRODUCTS CONTAINING POLYMERS OF VINYLOXYETHYLUREA AND METHOD OF PRODUCING THEM

Vincent J. Moser, Oreland, and Sidney Melamed, Philadelphia, Pa., assignors to Rohm & Haas Company, Philadelphia, Pa., a corporation of Delaware No Drawing. Application February 9, 1954, Serial No. 409,255

11 Claims. (Cl. 92—3)

This application relates to improved paper products and to methods of producing them. The invention is particularly concerned with the production of papers or paper-like products having increased wet strengths.

It is an object of the present invention to provide improved high wet strength papers or the like which do not require the presence of aldehydes such as formaldehyde or amine groups for the proper development of the improved wet strengths. An ancillary object of the invention is to produce high wet strength papers or the like which are adapted to a wider variety of uses than prior high wet strength papers which require the use of aldehydes for the proper development of the high wet strength. Other objects and advantages of the present invention will become apparent from the description thereof hereinafter below.

The improved products of the present invention are obtained by incorporating with the fibers thereof certain water-soluble polymers of certain vinyl ethers such as a vinoxyalkyl urea which may also be referred to as a polymer of a vinyl ureidoalkyl ether. The vinyl ether polymers that may be used most satisfactorily are those obtained by polymerization of a monomer having the general Formula I

I $$CH_2=CH-O-A-NRCONHR'$$

where A is selected from a class consisting of branched or straight chain alkylene groups having 2 to 4 carbon atoms between adjoining oxygen and nitrogen atoms and ether-oxygen linked alkylene groups having 2 to 3 carbon atoms, and R and R' are each selected individually from the class consisting of hydrogen, lower aliphatic groups having 1 to 3 carbon atoms, and ether-linked lower aliphatic groups having 1 to 3 carbon atoms, except that R may form with R' a ring-closing alkylene group selected from the class consisting of ethylene ($-CH_2-CH_2-$), propylene ($-CH(CH_3)CH_2-$), and trimethylene $-(CH_2)_3-$. The group taking the position of A may be ethoxyethyl and $-C_2H_4(OC_2H_4)_n-$ and examples of ether-linked lower aliphatic groups which may take the place of R and R' include $C_2H_5OC_2H_4-$ and $C_2H_5(OC_2H_4)_n-$ where $n$ is any integer but is preferably not over 2. The term "water-soluble" polymer is not limited to those polymers which form true solutions but includes those which form colloidal solutions or dispersions in water.

Specific examples of these polymers are those obtained by the polymerization, with or without other monomers, of:

1. Vinyloxyethylurea $$CH_2=CH-O-C_2H_4NHCONH_2$$

2. N-vinyloxyethyl-N,N'-ethylene-urea $$CH_2=CH-O\ C_2H_4N-\overset{\overset{O}{\|}}{C}-NH$$
$$\phantom{CH_2=CH-O\ C_2H_4N}|\phantom{\overset{O}{\|}}\phantom{C}\phantom{-}|$$
$$\phantom{CH_2=CH-O\ C_2H_4N}CH_2-CH_2$$

2

3. 1-(2-vinyloxyethyl)-2-hexahydropyrimidone $$CH_2=CH-O-CH_2CH_2-N\underset{\underset{O}{\overset{\|}{C}}}{\overset{CH_2\diagup CH_2\diagdown CH_2}{\diagdown\phantom{x}\diagup}}NH$$

4. 1-(2-vinyloxypropyl)-2-imidazolidone $$CH_2=CH-O-\overset{CH_3}{\underset{|}{C}H}-CH_2-N\underset{\underset{O}{\overset{\|}{C}}}{\overset{H_2C-CH_2}{\diagdown\phantom{x}\diagup}}NH$$

5. N-methyl-N-vinyloxyethylurea $$CH_2=CH-O-CH_2CH_2\underset{\underset{CONH_2}{|}}{N}-CH_3$$

6. N-vinyloxyethyl-N'-ethyl-urea $$CH_2=CH-O-C_2H_4NHCONHC_2H_5$$

7. Vinoxyethoxyethylurea $$CH_2=CH-O-C_2H_4OC_2H_4NHCONH_2$$

8. Vinyloxyethoxyethoxyethylurea $$CH_2=CH-O-C_2H_4OC_2H_4OC_2H_4NHCONH_2$$

The simple homopolymers may be used or a copolymer of two or more of the above vinyl ethers of Formula I, and especially the vinoxyalkylureas may be used. The vinyl ether of Formula I may be copolymerized with one or more other monoethylenically unsaturated monomers, such as acrylic acid, methacrylic acid, esters of acrylic acid or methacrylic acid and monohydric alcohols such as methyl, ethyl, butyl, octyl, dodecyl, cyclohexyl, cyanoethyl, and the like; esters of itaconic acid and the above alcohols; esters from maleic, fumaric or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; allylalcohol, allyl acetate, methacrylonitrile or acrylonitrile; acrylamide, or methacrylamide, and N-substituted amides of these types, such as dimethyl acrylamide; vinyl chloride, vinyl bromide, vinylidene chloride, vinylidene fluoride, vinylidene cyanide, 1-chloro-1-fluoroethylene, or ethylene, N-methyl-N-vinyloxyethyl-melamine, styrene, vinyl toluene, 2-vinylpyridine, 4-vinylpyridine, N-vinylpyrrolidone, N-vinylcaprolactam; or the vinyl ether of Formula I may be copolymerized with small amounts up to 0.5 to 5 molar percent, depending on the particular system, of polyene compounds such as allyl vinyl ether, esters of acrylic, methacrylic, and itaconic acids with allyl or methallyl alcohols, divinylbenzene, 1-acetoxy-1,3-butadiene, ethylene diacrylate or dimethacrylate, bis(vinoxyethyl)urea, vinoxyethyl acrylate, vinoxypropyl acrylate, etc.

Monomeric vinyloxyalkylureas may be obtained by reacting in an aqueous medium an aminoalkyl vinyl ether, such as aminoethyl vinyl ether, with a water-soluble inorganic cyanate, such as sodium or potassium cyanate, between 0° and 50° C. The reaction is effected by an acid, such as sulfuric acid, which is added continually in such a manner that the pH of the mixture is prevented from going below 6.8. The monomeric bis(vinoxyethyl)-urea may be obtained by fusing 2 moles of vinoxyethylamine with 1 mole of urea until 2 moles of NH₃ are driven off, the temperature at the end of the fusion reaching about 180–190° C. The N-vinyloxyethyl-N,N'-ethyleneurea is obtained by reacting a hydroxyethylethyllenediamine with acetylene at about 150° C. and 400 lbs./sq. in. pressure in the presence of potassium hydroxide to produce N-vinyloxyethylethylenediamine which is then mixed with half its molar equivalent weight of urea and about 2% of potassium cyanide. This mixture is fused with liberation of ammonia at temperatures gradually increasing from about 113° C. to 200° C. until two molar proportions of ammonia are removed. The other imidazolidones and hexahydropyrimidones are obtained in similar fashion from homologous hydroxyalkylalkylenediamines. The monomeric N-methyl-N-vinyloxyethylmelamine may be obtained by reacting 10 parts of dicyandiomide, 12.6 parts of N-methyl-N-vinyloxyethylcyanamide (obtained by reacting N-methylaminoethyl vinyl ether with cyanogen chloride, at 0° to 75° C. in an inert solvent, such as benzene, containing an inorganic alkaline reagent, such as anhydrous potassium carbonate and separating the product from the benzene layer by collecting the fraction thereof distilling at 137°–139°/32 mm.), and a solution of 2 parts of potassium hydroxide in 50 parts of isopropanol under reflux for 6 hours and subsequent standing 16 hours, chilling to 0° C., filtering and washing the filter cake product with water at 65° C.

The monomeric vinyl ether of Formula I may be polymerized alone or copolymerized with any of the other comonomers above by heating an aqueous dispersion or solution of the monomer or monomers containing a catalyst, such as dimethyl azodiisobutyrate, at 75° C. for about 16 hours, preferably in an inert atmosphere, such as of nitrogen.

The monomeric vinyl ethers of Formula I, including vinyloxyalkylureas, vinyloxyalkylmelamines and their polymers (including copolymers) are disclosed and claimed in the copending applications of Bortnick and Melamed, issued as U. S. Patent No. 2,734,890, of de Benneville and Melamed, U. S. Patent 2,694,687, November 16, 1954, of Melamed, U. S. Patent No. 2,727,019, and of Melamed, U. S. Patent No. 2,734,891.

The molecular weight of the polymer or copolymer used should be such that its intrinsic viscosity in water is between 0.05 and 0.5 (100 cc. solution/g. units) as defined and determined in Bawn, The Chemistry of High Polymers, 1948, p. 162, Interscience Publishers, Inc., New York. When the other comonomers that are used are of water-insoluble type or produce water-insoluble polymers, the proportion thereof should be insufficient to impart to the copolymer water-insolubility and this is particularly important when a diethylenically unsaturated comonomer is used. Generally, copolymers containing at least 50 mole percent, and preferably at least 80 mole percent, of the vinyl ether of Formula I are adequately water-soluble or water-dispersible to operate satisfactorily. It has been found that copolymers of the invention containing from 1 to 20 mole % of an amine-containing monomer, such as 4-vinylpyridine, 2-vinylpyridine, aminoethylvinyl ether, aminopropylvinyl ether, dimethylaminoethyl vinyl ether, and N-methyl-N-vinoxyethyl melamine, increase the pick-up of the polymer on bleached pulps, apparently because of a certain amount of substantivity thereto. When comonomers are used that contain amine groups, they preferably are less basic than those having a $K_b = 10^{-7}$.

The polymer may be added to the fiber of the paper-forming stuff at any suitable stage prior to the sheeting. For example, it may be added prior to, during, or after the beating stage. Thus it may be added in the beater, in the Jordan, the fanpump, or the headbox. Preferably, the addition of the polymer to the stuff is made in the beater after the beating has been completed to the desired extent of hydration of the fiber. When the polymer is incorporated at this stage, it may be, and preferably is, mixed in by simple stirring without further action on the fiber by the beater knives.

From ¼ to 3% of the polymer based on the weight of the fiber is generally adequate to provide beneficial improvement in the wet strength of the product. More than 3% to 5% may be incorporated for special purposes but is unnecessary in most cases to provide the maximum or optimum wet strengths.

The paper stock may be formed of any suitable cellulosic fibers such as kraft, sulfite, waste news, mixtures of ground-wood with sulfite or kraft, mixtures of waste news with sulfite or kraft or mixtures of sulfite with kraft pulps. The fibers used may be either bleached or unbleached. Generally, it has been found that the benefits obtained by incorporation of the polymers of the present invention are even more pronounced when incorporated with poorer grades of fibers, stuffs or stocks and particularly unbleached stocks than with the higher grade pulps such as those which are generally considered high alpha-cellulose pulps.

The addition of the water-soluble polymers to the fiber stock may be effected at any dilution but, as pointed out above, the addition is preferably performed upon the stock while in the beater, where the concentration of the pulp may be from 1 to 4% in conventional practice. Before or after the incorporation of the polymer into the fiber slurry, the pH is adjusted to a value between about 4 and 7, such as by the addition of hydrochloric acid, sulfuric acid, alum, or the like; and any further dilution to the proper consistency for sheeting is effected within the pH limits cited above to provide any pre-determined pH value desired. Concentrations of 0.001 to 0.5% fiber or any other concentration of fiber that is conventional may be used in the headbox or deckelbox.

After appropriate dilution, the fiber slurry containing the water-soluble polymer is sheeted in any suitable way such as on conventional machinery, and the sheet is then pressed before or after drying to the extent needed to produce the final density desired in the sheet. After drying, the sheet may be conditioned to any predetermined moisture-content such as from 3 to 8% and aged to develop the wet strength.

It has been found that the wet strength increases progressively over a period of two or three weeks from the time of initial drying and conditioning. This slow development of wet strength has the advantage that it permits reworking of the "broke" and trim. However, this aging period may be shortened by a step of baking the sheet such as at temperatures of 100–150° C. for periods of three to fifteen minutes, the time being selected in inverse relation to the temperature. If desired, the papers may be treated with formaldehyde to hasten the development of the high wet strength while still wet or only partially dried, such as by a tub-sizing operation.

It is thought that the active hydrogen on one or both of the nitrogen atoms of the ureido groups has some affinity for the cellulose either by virtue of secondary valence bonds or of chemical bonding through reaction with reactive groups in the cellulose molecule, such as the hydroxyl groups thereof. There is at least a strong adsorption of the water-soluble polymer on the fibers and possibly chemical bonding. It has been found that the adsorption or bonding is greater than that of the methylated polymers. Because of this, there is less of the polymer carried by the drainage liquid from the sheeting operation than is the case when methylolated compounds, such as conventional urea-formaldehyde and melamine-formaldehyde condensates, are employed.

The following examples in which the parts given are by weight unless otherwise specified are illustrative of the present invention:

*Example 1*

An unbleached kraft pulp was beaten at 2% consistency to 600 cc. Canadian Standard Freeness. After dilution of the pulp to 1% concentration, there was mixed in 2% by weight of the homopolymer of vinoxyethylurea based on the weight of the fiber. The polymer was thoroughly mixed into the slurry and the pH was adjusted to 4 with hydrochloric acid. The pulp was diluted to 0.03% concentration while maintaining the pH at 4.0 and was then sheeted. The wet sheet was pressed to 32% solids, dried, conditioned to 8% moisture-content and tested. The resulting sheet was a 35-lb. paper (weight of 500 sheets 24" x 36") and was found to have a wet tensile strength of 4.1 lbs. in. after ageing one day, 7.4 lbs./in. after ageing seven days, and 10.7 lbs./in. after 28 days. At this time, it had a dry tensile strength of 33.1 lbs./in. A similarly prepared control sheet made without the polymer was found to have a wet tensile strength of 0.4 lb./in. and a dry tensile strength of 25.0 lbs./in.

*Example 2*

The procedure of Example 1 was followed except that a bleached sulfite pulp was used instead of the unbleached kraft pulp. The wet tensile strength of the polymer-containing sheet after ageing one day was 1.6 lbs./in.; after 28 days, the wet tensile strength was 3.5 lbs./in. and the dry tensile strength was 13.2 lbs./in. The corresponding control sheet which contained no polymer had a wet tensile strength of 0.4 lb./in. and 10.0 lbs./in.

*Example 3*

The procedure of Example 1 was followed using the bleached sulfite pulp of Example 2 and replacing the resin with a copolymer of 97.5 mole percent of ureidoethyl vinyl ether with 4-vinylpyridine containing 2.5 mole percent of the vinylpyridine. After ageing 28 days, the wet tensile strength was 2.7 lbs./in. and the dry tensile 12.6 lbs./in.

*Example 4*

The procedure of Example 1 was followed except the resin was replaced by a copolymer of ureidoethyl vinyl ether with aminoethyl vinyl ether containing 20 molar percent of the latter component. The sheet after one day had a wet tensile strength of 3.4 lbs./in.; after seven days, 4.9 lbs./in.; and after 28 days, 6.5 lbs./in. At the last mentioned time, the dry tensile strength was 25.6 lbs./in. These values are to be compared with a control sheet having a wet tensile of 0.4 lb./in., and a dry tensile of 20.4 lbs./in.

*Example 5*

The procedure of Example 1 was followed except that beating was carried to a Canadian Standard Freeness of 490; only 0.5%, based on the weight of the fiber, of an acetate of a copolymer of 66⅔ molar percent N-vinyloxyethyl-N,N'-ethylene urea (compound 2 of the list hereinabove) with 33⅓ molar percent of N-methyl-N-vinyloxy-ethyl melamine (product of Ex. 1 (a) of S.N. 348,104, now patent 2,694,687, supra), and after mixing in the polymer, the pH was adjusted to 4.5 (instead of 4). The wet and dry tensile strengths were markedly improved. After seven days' ageing, the wet tensile strength was 6.0 lbs./in. as compared to a value of 0.6 lb./in. for the control sheet.

*Example 6*

The procedure of Example 5 was followed except that the pulp was a bleached kraft pulp and the copolymer used was one of 88 mole percent of N-vinyloxyethyl-N,N'-ethylene urea, 10 mole percent of N-methyl-N-vinyloxyethylmelamine and 2.0 mole percent of N,N'-bis-vinyloxyethyl urea. After ageing 28 days, the wet tensile strength was 5.5 lbs./in. as compared to a control of 0.6 lb./in.

The water-soluble polymer of the present invention is adsorbed by or reacted with the fibers of the paper as mentioned above and the affinity is adequate to prevent leaching of the polymer from the formed sheet in spite of the inherent water-soluble characteristics of the initial polymer. Besides increasing the wet and dry tensile strengths, folding and bursting strengths of the paper are also increased. The extent to which the various strengths, and particularly the wet tensile strength, are increased depends upon the proportion of the polymer added, but the greatest benefits are obtained even when as little as 2 to 3% of the polymer based on the weight of the fiber is used. Greater proportions may be used but are generally not warranted by the additional benefit obtained.

The wet-strength producing polymers of the present invention are much more stable than aldehyde-containing materials that have been commonly used heretofore. They can be stored either in dry condition or in the form of aqueous solutions for long periods without objectionable change in characteristics.

The process of the present invention may be employed for producing any type of paper where high wet strength is desirable. Examples are paper toweling, facial tissues, disposable diapers, napkins, infusers, such as paper tea bags, map paper, reproduction papers, such as photographic papers of all types, including blue print paper of all kinds, also wrapping papers, such as for wrapping foods.

The products of the present invention are particularly valuable for photographic papers since they do not contain any aldehydes or tend to liberate any aldehydes, such as formaldehyde which would affect the light sensitive materials that are carried thereon, such as the gelatin-silver bromide-chloride emulsions. Those polymers which are free of amines and aldehydes are also extremely valuable when used for purposes that would bring the paper into contact with foods, such as wrapping paper, since such papers are substantially free of taste and odor.

It is to be understood that changes and variations may be made without departing from the spirit and scope of the invention as defined hereon.

We claim:

1. As a new article of manufacture, a fibrous product comprising cellulosic fibers and having incorporated in the body thereof an initially water-soluble polymer selected from the class consisting of homopolymers of vinyloxyethylurea and copolymers of vinyloxyethylurea with 4-vinyl pyridine.

2. An article as defined in claim 1 in which the polymer is a homopolymer of vinyloxyethylurea.

3. An article as defined in claim 1 in which the polymer is a copolymer of 97.5 mole percent of vinyloxyethyl urea with 2.5 mole percent of 4-vinyl pyridine.

4. An article of manufacture as defined in claim 1 in which the polymer is present in an amount of about ¼ to 3% by weight of the cellulosic fibers.

5. As a new article of manufacture, a fibrous product comprising cellulosic fibers and having incorporated in the body thereof about ¼% to 3% by weight, based on the weight of the fibers, of an initially water-soluble copolymer of 1 to 20 mole per cent of 4-vinyl pyridine and 80 to 99 mole percent of vinyloxyethylurea.

6. A process for producing a wet-laid fibrous product comprising mixing cellulosic fibers in an aqueous suspension thereof with a water-soluble polymer selected from the class consisting of homopolymers of vinyloxyethylurea and copolymers of vinyloxyethylurea with 4-vinyl pyridine, sheeting the mixture, drying the sheet and ageing it to develop increased wet strength.

7. A process for producing a wet-laid fibrous product comprising mixing cellulosic fibers in an aqueous suspension thereof with a water-soluble polymer selected from the class consisting of homopolymers of vinyloxyethylurea and copolymers of vinyloxyethylurea with 4-vinyl pyridine, sheeting the mixture, drying the sheet and baking it to develop increased wet strength.

8. A process for producing a high wet strength paper comprising beating an aqueous suspension of cellulosic paper-forming fibers, mixing a water-soluble polymer selected from the class consisting of homopolymers of vinyloxyethylurea and copolymers of vinyloxyethylurea with 4-vinyl pyridine, adjusting the pH to a value between about 4 to 7, subsequently forming a wet sheet of the mixture of the fibers and polymer, pressing the sheet to a predetermined extent, and drying the pressed sheet.

9. A process as defined in claim 8 in which the polymer is mixed into the fiber suspension in an amount of about ¼ to 3% by weight of the fibers.

10. A process as defined in claim 8 in which the polymer is poly(vinyloxyethylurea).

11. A process as defined in claim 8 in which the polymer is a copolymer of 97.5 mole percent of vinyloxyethylurea with 2.5 mole percent of 4-vinyl pyridine.

References Cited in the file of this patent

UNITED STATES PATENTS

| | | |
|---|---|---|
| 2,338,602 | Schur | Jan. 4, 1944 |
| 2,601,597 | Daniel et al. | June 24, 1952 |
| 2,655,494 | Kropa et al. | Oct. 13, 1953 |
| 2,683,089 | Reynolds | July 6, 1954 |
| 2,689,844 | Melamed | Sept. 21, 1954 |
| 2,694,687 | De Benneville et al. | Nov. 16, 1954 |
| 2,694,696 | Melamed | Nov. 16, 1954 |